(12) United States Patent
Askan

(10) Patent No.: US 11,373,815 B2
(45) Date of Patent: Jun. 28, 2022

(54) CIRCUIT BREAKER

(71) Applicant: Eaton Intelligent Power Limited, Dublin (IE)

(72) Inventor: Kenan Askan, Vienna (AT)

(73) Assignee: Eaton Intelligent Power Limited, Dublin (IE)

( * ) Notice: Subject to any disclaimer, the term of this patent is extended or adjusted under 35 U.S.C. 154(b) by 420 days.

(21) Appl. No.: 16/331,537

(22) PCT Filed: Sep. 8, 2017

(86) PCT No.: PCT/EP2017/072669
§ 371 (c)(1),
(2) Date: Mar. 8, 2019

(87) PCT Pub. No.: WO2018/046709
PCT Pub. Date: Mar. 15, 2018

(65) Prior Publication Data
US 2019/0206639 A1 Jul. 4, 2019

(30) Foreign Application Priority Data
Sep. 9, 2016 (DE) .................. 10 2016 117 006.2

(51) Int. Cl.
*H01H 9/54* (2006.01)
*H01H 9/56* (2006.01)
(Continued)

(52) U.S. Cl.
CPC .............. *H01H 9/542* (2013.01); *H01C 7/12* (2013.01); *H01H 9/548* (2013.01); *H01H 9/563* (2013.01);
(Continued)

(58) Field of Classification Search
CPC .. H01H 9/542; H01H 9/548; H01H 2009/544; H01H 9/563; H01H 2009/546;
(Continued)

(56) References Cited

U.S. PATENT DOCUMENTS 4,740,858 A * 4/1988 Yamaguchi .......... H01H 33/596
361/4
7,916,438 B2 3/2011 Ward
(Continued)

FOREIGN PATENT DOCUMENTS

| CN | 101589528 A | 11/2009 |
|---|---|---|
| CN | 101609938 A | 12/2009 |

(Continued)

*Primary Examiner* — Scott Bauer
(74) *Attorney, Agent, or Firm* — Leydig, Voit & Mayer, Ltd.

(57) ABSTRACT

A circuit breaker includes: at least one external conductor section from an external conductor supply connection in the circuit breaker to an external conductor load connection in the circuit breaker; and a neutral conductor section from a neutral conductor connection in the circuit breaker to a neutral conductor connection in the circuit breaker. The at least one external conductor section includes a mechanical bypass switch and a first mechanical isolating switch which are serially arranged. A second mechanical isolating switch is arranged in the neutral conductor section. A semiconductor circuit arrangement in the circuit breaker is connected in parallel to the bypass switch. A current measuring device is arranged in the at least one external conductor section that is linked to an electronic control unit in the circuit breaker. The electronic control unit operates the bypass switch, the first and second mechanical isolating switches, and the semiconductor circuit arrangement.

11 Claims, 1 Drawing Sheet

(51) Int. Cl.
*H02H 3/08* (2006.01)
*H02H 3/02* (2006.01)
*H01C 7/12* (2006.01)

(52) U.S. Cl.
CPC ............ *H02H 3/021* (2013.01); *H02H 3/023* (2013.01); *H02H 3/08* (2013.01); *H01H 9/56* (2013.01); *H01H 2009/543* (2013.01); *H01H 2009/544* (2013.01)

(58) Field of Classification Search
CPC ........ H02H 3/023; H02H 3/08; H02H 1/0007; H02H 3/021; H01C 7/12
See application file for complete search history.

(56) References Cited

U.S. PATENT DOCUMENTS

| | | | |
|---|---|---|---|
| 8,274,767 B2 | 9/2012 | Fukuda | |
| 8,432,649 B2 | 4/2013 | Seon | |
| 8,446,699 B2* | 5/2013 | Jackson | H02H 3/33 361/42 |
| 9,659,721 B1* | 5/2017 | Sastry | H02H 1/0061 |
| 2003/0193770 A1* | 10/2003 | Chung | H01H 9/542 361/118 |
| 2011/0102052 A1 | 5/2011 | Billingsley et al. | |
| 2012/0218676 A1* | 8/2012 | Demetriades | H01H 9/542 361/115 |
| 2013/0021708 A1* | 1/2013 | Demetriades | H02H 3/023 361/102 |
| 2015/0002977 A1* | 1/2015 | Dupraz | H01H 9/548 361/115 |
| 2015/0222111 A1* | 8/2015 | Magnusson | H01H 33/165 361/91.5 |
| 2015/0371799 A1 | 12/2015 | Sumino et al. | |
| 2017/0236676 A1 | 8/2017 | Bartonek | |
| 2018/0076735 A1* | 3/2018 | Bakran | H02M 5/4585 |
| 2019/0206638 A1* | 7/2019 | Askan | H01H 9/542 |
| 2019/0206640 A1* | 7/2019 | Askan | H02H 3/08 |
| 2019/0252143 A1* | 8/2019 | Askan | H02H 7/222 |
| 2019/0279829 A1* | 9/2019 | Askan | H02H 3/08 |
| 2020/0194195 A1* | 6/2020 | Askan | H01H 9/542 |

FOREIGN PATENT DOCUMENTS

| | | |
|---|---|---|
| CN | 101924342 A | 12/2010 |
| CN | 102217177 A | 10/2011 |
| WO | WO 2015028634 A1 | 3/2015 |
| WO | WO 2015193468 A1 | 12/2015 |

* cited by examiner

CIRCUIT BREAKER

CROSS-REFERENCE TO PRIOR APPLICATIONS

This application is a U.S. National Phase application under 35 U.S.C. § 371 of International Application No. PCT/EP2017/072669, filed on Sep. 8, 2017, and claims benefit to German Patent Application No. DE 10 2016 117 006.2, filed on Sep. 9, 2016. The International Application was published in German on Mar. 15, 2018 as WO 2018/046709 under PCT Article 21(2).

FIELD

The invention relates to a circuit breaker.

BACKGROUND

A corresponding circuit breaker is known from WO 2015/028634 AI by the applicant.

Such circuit breakers follow the so-called 'zero voltage switching' principle.

When the circuit breaker is turned off, first the bypass switch is opened, which results in an electrical arc and the current is commutated to the semiconductor circuit arrangement.

SUMMARY

In an embodiment, the present invention provides a circuit breaker, comprising: at least one external conductor section from an external conductor supply connection in the circuit breaker to an external conductor load connection in the circuit breaker; and a neutral conductor section from a neutral conductor connection in the circuit breaker to a neutral conductor connection in the circuit breaker, wherein the at least one external conductor section comprises a mechanical bypass switch and a first mechanical isolating switch which are serially arranged, wherein a second mechanical isolating switch is arranged in the neutral conductor section, wherein a semiconductor circuit arrangement in the circuit breaker is connected in parallel to the bypass switch, wherein a current measuring device is arranged in the at least one external conductor section that is linked to an electronic control unit in the circuit breaker, wherein the electronic control unit is configured to operate the bypass switch, the first mechanical isolating switch, the second mechanical isolating switch, and the semiconductor circuit arrangement as predefined, wherein parallel to the bypass switch, a voltage-dependent resistance is arranged, and wherein the electronic control unit is configured so that when the circuit breaker is switched on the electronic control unit operates the second mechanical isolating switch to close, subsequently to operate the first mechanical isolating switch to close, and then to switch on the semiconductor circuit arrangement a predefined first time period thereafter.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a circuit breaker of the type mentioned at the beginning with which the disadvantages mentioned can be avoided, which is a smaller size and a longer service life, and which can be manufactured with little effort.

In this way, a circuit breaker can be made that features a small size and a long lifespan and can be manufactured with little effort.

In this way, the amplitude of the voltage spike, to which the voltage-dependent resistance is exposed, is significantly reduced. In this way, a voltage-dependent resistance, i.e., a varistor, can be used with lower rated voltage. Such a device has a lower leakage current than a varistor with a higher rated voltage, which results in less heating of the circuit breaker during operation, which in turn extends the service life of this component and the other semiconductors in its vicinity.

In this way, furthermore, lower collector-emitter reverse voltage can be used to equip the semiconductor switches which are usually IGBTs. In this way, in addition, diodes with lower periodic peak reverse voltage can be used. Such modules, compared to modules with higher resilience, have significantly smaller dimensions and are also less costly. In this way, the costs and the size of a circuit breaker can be lowered and, at the same time, the heat produced reduced and the corresponding lifespan increased.

As an alternative here, the electrical durability of a circuit breaker can be significantly increased while the size remains the same.

Semiconductors with a lower collector-emitter reverse voltage or periodic voltage spikes also have lower internal resistance, which means that in the event of a shut-down, the time required to commutate the growing short-circuit current by the bypass switch to the first semiconductor circuit can be reduced. In this way, the load on the bypass switch and the first semiconductor circuit arrangement can be further reduced.

By reducing the size, thus the physical surface, of the semiconductor, the loop inductance of the first semiconductor circuit can be significantly lowered. In addition to the resistance, this is another primary influence factor in the commutation time of the growing short circuit current from the bypass branch to the first semiconductor circuit, which is further lowered by reducing the physical surface area of the semiconductor.

Furthermore, the higher transient voltage spikes are lowered, which are released into the grid through the circuit breaker's internal switching process.

Furthermore, with a snubber in the area of the semiconductor circuit arrangement, it can be significantly reduced or even eliminated.

Figure 1:
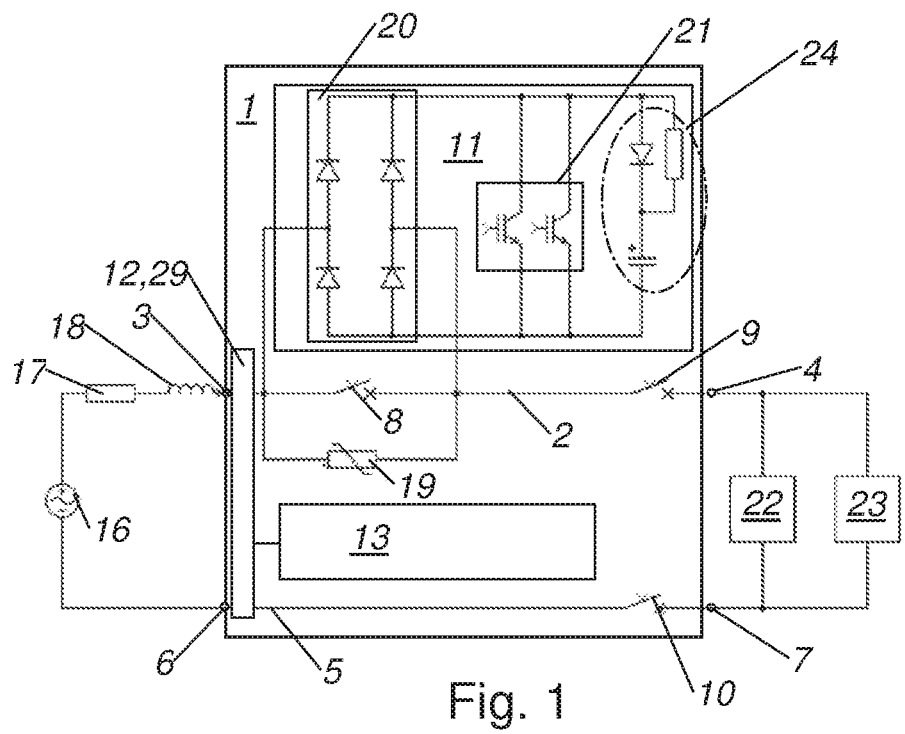
FIG. 1 an embodiment of a concrete circuit breaker.

FIG. 1 depicts a preferred embodiment of a circuit breaker 1 with at least one external conductor section 2 of an external conductor supply connection 3 of the circuit breaker 1 to an external conductor load connection 4 in the circuit breaker 1, and a neutral conductor section 5 from a neutral conductor connection 6 in the circuit breaker 1 to a neutral load connection 7 in the circuit breaker 1, wherein a mechanical bypass switch 8 and a first mechanical isolating switch 9 are serially arranged in the external conductor section 2, wherein in the neutral conductor section 5, a second mechanical isolating switch 10 is arranged, wherein a semiconductor circuit arrangement 11 in the circuit breaker 1 is parallel connected to the bypass switch 8, wherein in the external conductor section 2 a current measuring device 12 is arranged that is connected with an electronic control unit 13 in the circuit breaker 1, wherein the electronic control unit 13 is designed to operate the bypass switch 8, the first mechanical isolating switch 9, the second mechanical isolating switch 10 and the semiconductor circuit arrangement 11 in a predefined way, and wherein a voltage-dependent resistance 19 is arranged in parallel to the bypass switch 8, in particular a varistor, wherein the electronic control unit 13 is designed to operate the second mechanical isolating switch 10 to close only when the circuit breaker 1 is switched on, subsequently to operate the first mechanical isolating switch 9 to close, and to turn on the semiconductor circuit arrangement 11 after a predefined first time period.

In this way, a circuit breaker 1 can be made that has a small size and a long lifespan and can be manufactured with little effort.

In this way, the amplitude of the voltage spike, to which the voltage-dependent resistance 19 is exposed, to be significantly reduced. In this way, a voltage-dependent resistance 19, i.e., a varistor, with lower rated voltage to be used. Such a device has a lower leakage current than a varistor with a higher rated voltage, which results in less heating of the circuit breaker 1 during operation, which in turn extends the service life of this component and the other semiconductors in its vicinity.

In this way, furthermore, lower collector-emitter reverse voltage can be used to equip the semiconductor switches, which are usually IGBT 21. In this way, in addition, diodes with lower periodic peak reverse voltage can be used. Such modules, compared to modules with higher resilience, have significantly smaller dimensions and are also less costly. In this way, the costs and the size of a circuit breaker 1 can be lowered while at the same time the heat produced is reduced and the corresponding lifespan increased. As an alternative, the electrical durability of a circuit breaker 1 can be significantly increased while the size remains the same.

Semiconductors with lower collector-emitter reverse voltage or periodic voltage spikes also show a lower internal resistance which means that in the event of a shut-down, the time required to commutate the building short-circuit current by the bypass switch to the first semiconductor circuit 11 can be reduced. In this way, the load on the bypass switch 8 and the first semiconductor circuit arrangement 11 can be further reduced.

Reducing the size, thus the physical surface, of the semiconductor 21 can significantly lower the loop inductance of the first semiconductor circuit arrangement 11. This is another primary influence factor in addition to the resistance in the commutation time of the growing short circuit power from the bypass branch to the first semiconductor circuit arrangement 11, which is further lowered by the reduction of the physical surface area of the semiconductor 21.

Furthermore, the higher transient voltage spikes are lowered, which are released into the grid through the circuit breaker 1 internal switching process.

Furthermore, with a snubber 24 in the area of the semiconductor circuit arrangement 11, it can be significantly reduced or even eliminated.

The circuit breaker 1 according to FIG. 1 has an external conductor section 2 as well as a neutral conductor section 5. The external conductor section 2 runs through the circuit breaker 1 from an external conductor supply connection 3 to an external conductor load connection 4. The neutral conductor section 5 runs through the circuit breaker 1 from a neutral conductor connection 6 to a neutral conductor load connection 7. The connections 3, 4, 6, 7 are shown as preferably screw terminals or plug connectors, and arranged in the circuit breaker 1 to be accessible from the outside.

The circuit breaker 1 in question is preferably a low voltage distribution circuit breaker. The common range is shown as up to 1,000 V AC or 1500 V DC, as is common in the field.

The circuit breaker 1 preferably has an insulated housing.

A mechanical bypass switch 8 and a first mechanical isolating switch 9 are serially arranged in the external conductor section 2. A second mechanical isolating switch 10 is arranged in the neutral conductor section 5. A semiconductor circuit arrangement 11 is parallel connected to the bypass switch 8.

Furthermore, parallel-connected to the bypass switch 8 is a voltage-dependent resistor 19 which is, in specific, designed as a metal-oxide varistor.

The circuit breaker 1 furthermore has a current measuring device 12 which is arranged in the external conductor section 2 and which is preferably designed to comprise a shunt resistor.

The current measuring device 12 is connected to an electronic control unit 13 in the circuit breaker 1 which is preferably designed to comprise a micro-controller or microprocessor. The electronic control unit 13 is designed to control the bypass switch 8, the first mechanical isolating switch 9, the second mechanical isolating switch 10 and the semiconductor circuit arrangement 11 which is why they are to be operated or switched as predefined. For this purpose, the electronic control unit 13 is preferably connected circuitry-wise to the first semiconductor circuit arrangement 11, as well as further to, in particular electromagnetic, actuating elements of the mechanical switches, therefore the bypass switch 8, the first mechanical isolating switch 9 and the second mechanical isolating switch 10. The corresponding connections, depending on the electronic control unit 13, are not depicted in FIG. 1.

The semiconductor circuit arrangement 11 preferably comprises a rectifier switch 20 which is preferably designed as full bridge, as well as two power semiconductor switches 21, preferably designed as IGBT, as the actual switch or regulating elements.

In FIG. 1, the electrical surroundings are indicated next to the actual circuit breaker 1. It depicts the power supply grid through the AC/DC grid source 16, the grid interior resistance 17 and the grid inductance 18. Furthermore, it depicts an electrical load 23 and an electrical error 22 in the form of a short circuit.

It is envisioned for a circuit breaker 1 according to FIG. 1 that a disconnection procedure from the bypass switch 8 and the first semiconductor circuit arrangement 11 is performed and the first and second isolating switches 9, 10 only serve to ensure a galvanic separation of the load circuit after the disconnection is successful.

For the predefined, in particular manually controlled, disconnecting and switching-off of the circuit breaker 1, in particular during operation of the circuit breaker 1 within the rated current range, it is envisioned that the bypass switch 8 is switched off or opened during zero voltage switching. If the load is reactive, i.e., inductive or capacitive, the current will not be zero during zero voltage switching and consequently when it is disconnected. The amount of current is here known to be dependent on the related cos (p. It is envisioned that the first and second mechanical isolating switches 9, 10 are opened after the bypass switch 8 and the subsequent blocking of the IGBT 21, as soon as the current through the circuit breaker 1 is low enough, therefore as soon as the current falls below a pre-settable limit value, especially in the area of zero voltage switching for alternating current. This allows the heating of the varistor caused by the leakage current to be kept down even with strongly reactive loads.

To switch on the circuit breaker 1, it is envisioned that the electronic control unit 13, which is designed accordingly, first operates the second mechanical isolating switch 10 and then the first mechanical isolating switch 9 so that their switching contacts are closed. The first and second mechanical isolating switches 9, 10 are preferably designed as part of a bistable relay. After a predefined first time period, the control unit 13 then activates the semiconductor circuit arrangement 11.

The first time period is preferably long enough that the first mechanical isolating switch 9 switching contact and the second mechanical isolating switch 10 switching contact have reached a mechanical stationary state. Therefore, they must rest securely against each other without bouncing.

The practical implementation of the specific invention has shown that the initial time period is between 0.8 ms and 1.2 ms, in particular essentially 1 ms. However, these values may vary depending on the type of switch for the first and second mechanical isolating switches 9, 10.

The circuit breaker 1 in question is preferably designed for operation both on a DC grid or on an AC grid.

When the circuit breaker 1 is designed as an AC switch, it is envisioned that this additionally has a voltage measuring arrangement 29 which is connected to the control unit 13, and that the electronic control unit 13 is designed to operate the first mechanical isolating switch 9 and the second mechanical isolating switch 10 for a predefined second period of time before a first zero voltage switching of connected voltage. The voltage measurement arrangement 29 is only depicted in FIG. 1 with the current measuring device 12.

Power supply grids with alternating current are generally very stable with regard to their grid frequency, whereby fluctuations between directly successive zero voltage switchings are extremely low. The preferred method is to determine the current period length of the respective grid before the actual switch-on process by means of a predefinable number of zero voltage switchings. This means that such a circuit breaker 1 can be used equally and without further adjustments in grids with different power line frequencies.

After a few zero voltage switchings, especially eight to twelve, a sufficiently accurate value can be determined for the period length. As soon as this has been done, the determined time period of less than the second time period is waited until the first and second mechanical isolating switches 9, 10 are switched on by the electronic control unit 13 after a so-called zeroed zero voltage switching. In this way the two isolating switches 9, 10 can be switched on at the determined time point before the first zero voltage switching in the sequence shown according to which first, the second isolating switch 10, which switches the neutral conductor section 5, is switched on, and only afterwards the first isolating switch 9 is closed.

It is preferably envisioned that the second time period is essentially half the length of the first time period. In doing so, these are then symmetrically arranged around the first zero voltage switching.

Furthermore, it is preferably envisioned that the electronic control unit 13 is designed to switch on the bypass switch (8) immediately after the first zero voltage switching at a subsequent second zero voltage switching of connected voltage.

Figure 2:
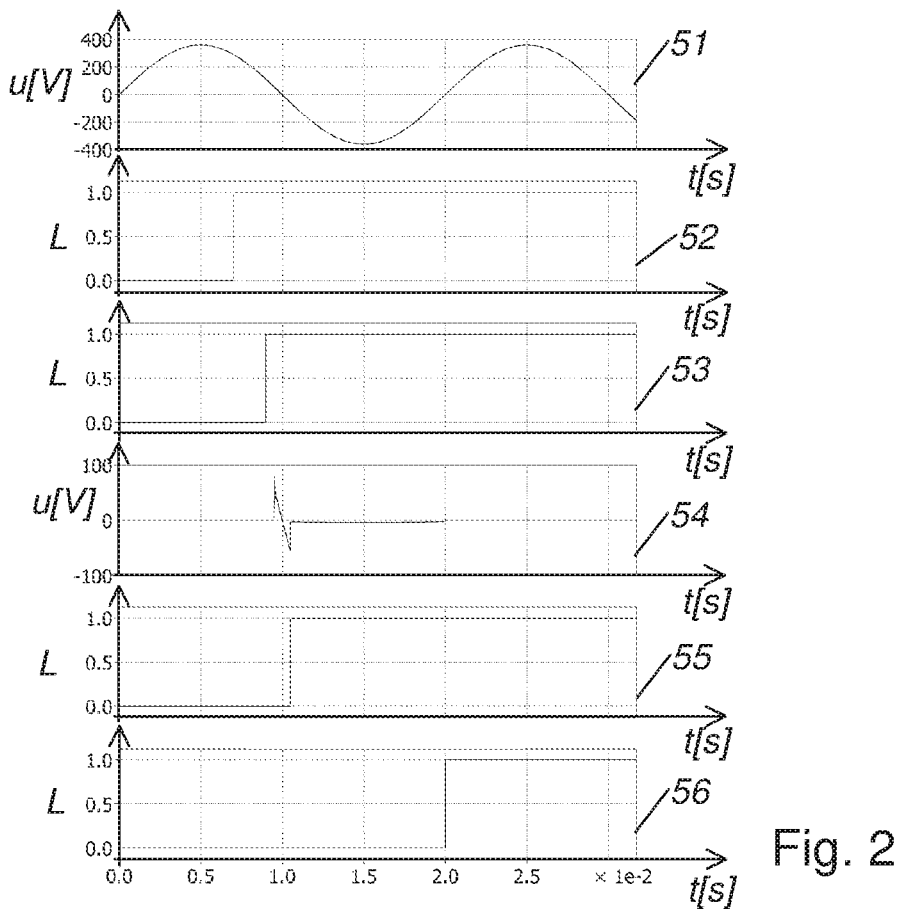
FIG. 2 a temporal switching sequence of a circuit breaker according to FIG. 1.

FIG. 2 depicts a corresponding switching procedure in six diagrams 51, 52, 53, 54, 55, 56. The first diagram 51 depicts the progression of the voltage which can be designated as the source voltage. The second diagram 52 depicts the logical on-off switching signal of the second mechanical isolating switch 10, wherein the logical value 1 indicated with L, as in diagrams 53, 55 and 56, represents "ON" and the logical value 0 represents "OFF". The third diagram 53 depicts the logical on-off switching signal of the first mechanical isolating switch 9. The fourth diagram 54 depicts the progression of the voltage at the voltage-dependent resistance 19. The fifth diagram 55 depicts the logical on-off switching signal for the IGBT. The sixth diagram 56 depicts the logical on-off switching signal for the bypass switch 8.

Through the present measures, the semiconductor circuit arrangement 11 can also be designed without an attenuator wherein additional components are unnecessary and which avoids having to charge a capacitor during the switch-on process. In this way, the semiconductor circuit arrangement 11 uses less current in the switching process. A corresponding attenuator, which is also called a snubber 24, is shown in FIG. 1.

According to the preferred continuation, it is envisioned that the voltage-dependent resistance 19 is designed as a ThermoFuse varistor whereby the operation safety can be further increased.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A circuit breaker, comprising:
   at least one external conductor section extending from an external conductor supply connection in the circuit breaker to an external conductor load connection in the circuit breaker; and a neutral conductor section extending from a neutral conductor supply connection in the circuit breaker to a neutral conductor load connection in the circuit breaker, wherein the at least one external conductor section comprises a mechanical bypass switch and a first mechanical isolating switch which are serially arranged, wherein a second mechanical isolating switch is arranged in the neutral conductor section, wherein a semiconductor circuit arrangement in the circuit breaker is connected in parallel to the bypass switch, wherein a current measuring device is arranged in the at least one external conductor section that is linked to an electronic control unit in the circuit breaker, wherein the electronic control unit is configured to operate the mechanical bypass switch, the first mechanical isolating switch, the second mechanical isolating switch, and the semiconductor circuit arrangement as predefined, wherein parallel to the mechanical bypass switch, a voltage-dependent resistance is arranged, and wherein the electronic control unit is configured so that when the circuit breaker is switched on the electronic control unit operates the second mechanical isolating switch to close, subsequently to operate the first mechanical isolating switch to close, and then to switch on the semiconductor circuit arrangement a predefined first time period thereafter, wherein the circuit breaker is configured as an alternating current switching device comprising a voltage measuring arrangement that is linked to the electronic control unit, and wherein the electronic control unit is configured to operate the first mechanical isolating switch and the second mechanical isolating switch to close such that both the first mechanical isolating switch and the second mechanical isolating switch are closed for a predefined second time period before an occurrence of a first zero voltage switching of connected voltage after operating the first mechanical isolating switch to close.

2. The circuit breaker according to claim 1, wherein the first time period is long enough for a switching contact in the first mechanical isolating switch and a switching contact in the second mechanical isolating switch to reach a mechanical stationary state.

3. The circuit breaker according to claim 1, wherein the second time period is essentially half the length of the first time period.

4. The circuit breaker according to claim 1, wherein the first time period is between 0.8 ms and 1.2 ms.

5. The circuit breaker according to claim 1, wherein the electronic control unit is configured to switch on the mechanical bypass switch immediately after the first zero voltage switching at a subsequent second zero voltage switching of connected voltage.

6. The circuit breaker according to claim 1, wherein the semiconductor circuit arrangement is configured without an attenuator.

7. The circuit breaker according to claim 1, wherein the voltage-dependent resistance comprises a varistor.

8. The circuit breaker according to claim 7, wherein the varistor comprises a varistor with a thermally coupled fuse.

9. The circuit breaker according to claim 1, wherein the first time period is essentially 1 ms.

10. The circuit breaker according to claim 1, wherein the electronic control unit is configured to determine a period length of the connected voltage before operating the first mechanical isolating switch to close.

11. The circuit breaker according to claim 10, wherein electronic control unit is configured to determine the period length based on detecting a predefined number of zero voltage switching before operating the first mechanical isolating switch to close.

* * * * *